(12) United States Patent
Naito et al.

(10) Patent No.: US 10,703,207 B2
(45) Date of Patent: Jul. 7, 2020

(54) OUTBOARD MOTOR

(71) Applicant: YAMAHA HATSUDOKI KABUSHIKI KAISHA, Iwata-shi, Shizuoka (JP)

(72) Inventors: Takeshi Naito, Shizuoka (JP); Yoshihiro Mizushima, Shizuoka (JP); Makoto Mizutani, Shizuoka (JP); Noriyoshi Ichikawa, Shizuoka (JP); Makoto Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1 day.

(21) Appl. No.: 16/196,076

(22) Filed: Nov. 20, 2018

(65) Prior Publication Data
US 2019/0344667 A1    Nov. 14, 2019

(30) Foreign Application Priority Data

May 11, 2018 (JP) ................................ 2018/092017

(51) Int. Cl.
| | | |
|---|---|---|
| *B60L 3/04* | (2006.01) | |
| *B60L 15/20* | (2006.01) | |
| *B63H 20/12* | (2006.01) | |
| *B63B 49/00* | (2006.01) | |
| *H02K 11/27* | (2016.01) | |
| *H02K 5/22* | (2006.01) | |
| *B63H 20/10* | (2006.01) | |

(52) U.S. Cl.
CPC ............... *B60L 3/04* (2013.01); *B60L 15/20* (2013.01); *B63B 49/00* (2013.01); *B63H 20/10* (2013.01); *B63H 20/12* (2013.01); *H02K 5/22* (2013.01); *H02K 11/27* (2016.01); *B60L 2200/32* (2013.01)

(58) Field of Classification Search
CPC ................................... B60L 3/04; B63B 49/00
See application file for complete search history.

(56) References Cited

U.S. PATENT DOCUMENTS

| | | | |
|---|---|---|---|
| 6,392,859 B1 * | 5/2002 | Ohshima | H01L 27/0248 361/100 |
| 6,441,679 B1 * | 8/2002 | Ohshima | H03K 17/0822 323/282 |
| 10,023,284 B1 * | 7/2018 | Nakamura | B63H 21/17 |
| 2005/0287880 A1 * | 12/2005 | Okuyama | H02J 7/1423 440/1 |

(Continued)

FOREIGN PATENT DOCUMENTS

JP 2014-177172 A 9/2014

*Primary Examiner* — S. Joseph Morano
*Assistant Examiner* — Jovon E Hayes
(74) *Attorney, Agent, or Firm* — Keating and Bennett, LLP (57) ABSTRACT

In an outboard motor, a controller controls an electric motor. An output outputs a predetermined notification information in response to a notification command signal output from the controller. When the controller receives a shut-off signal indicating that a semiconductor fuse is off, the controller outputs the notification command signal and causes the output to output notification information. When the controller receives a recovery operation signal indicating a predetermined operation performed by a user from an operator in a state where the semiconductor fuse has turned off, the controller outputs a recovery command signal to the semiconductor fuse.

10 Claims, 6 Drawing Sheets

(56) References Cited

U.S. PATENT DOCUMENTS

| | | | | |
|---|---|---|---|---|
| 2006/0228956 A1* | 10/2006 | Watabe | ............... | B63H 20/007 440/6 |
| 2011/0228429 A1* | 9/2011 | Ueta | ................... | B60N 2/0232 361/31 |
| 2019/0344667 A1* | 11/2019 | Naito | .................... | H02K 11/27 |

* cited by examiner

OUTBOARD MOTOR

CROSS REFERENCE TO RELATED APPLICATIONS

This application claims the benefit of priority to Japanese Patent Application No. 2018-092017 filed on May 11, 2018. The entire contents of this application are hereby incorporated herein by reference.

BACKGROUND OF THE INVENTION

1. Field of the Invention

The present invention relates to an outboard motor.

2. Description of the Related Art

There is an outboard motor that has an outboard motor body including an engine and an electric motor for moving the outboard motor body. For example, the outboard motor described in Japanese Unexamined Patent Application 2014-177172 includes a trim-and-tilt device configured to tilt an outboard motor body in an up/down direction. The trim-and-tilt device has a hydraulic cylinder, a hydraulic pump and a PTT motor. The PTT motor is an electric motor and is electronically connected to an electric power supply such as a battery. The hydraulic pump is driven by the PTT motor to discharge working fluid. The hydraulic cylinder expands and contracts when supplied with the working fluid from the hydraulic pump. The expanding/contracting motion of the hydraulic cylinder causes the outboard motor body to perform a trim operation and a tilt operation.

There is an outboard motor that includes a steering device configured to rotate an outboard motor body to the left and right. The steering device includes, for example, a steering motor. The steering motor is an electric motor and is electronically connected to an electric power supply. The steering device rotates the outboard motor body to the left and right using a drive force of the steering motor.

It has been conceived to provide an outboard motor with a fuse to protect an electric motor such as those described above from abnormalities such as overcurrent. The fuse is disposed in an electric circuit between an electric power supply and an electric motor. When an abnormality occurs, the fuse blows and interrupts the electrical connection between the electric power supply and the electric motor.

SUMMARY OF THE INVENTION

The inventor of preferred embodiments of the present invention investigated using a semiconductor fuse in an outboard motor. A semiconductor fuse automatically turns off in response to an abnormality to stop power from being supplied. In addition, a semiconductor fuse will automatically turn back on to restart the supply of power when the abnormality has been solved.

However, when a semiconductor fuse is used in an outboard motor, it is impossible for the user of the outboard motor to visually discern whether or not the semiconductor fuse has turned off. In addition, when the semiconductor fuse has automatically turned back on after being in the off state, the user of the outboard motor cannot discern the timing at which the semiconductor fuse turned back on.

Preferred embodiments of the present invention provide outboard motors each of which enable a user to easily discern that a semiconductor fuse has turned off and to perform an operation to turn the semiconductor fuse back on.

An outboard motor according to a preferred embodiment of the present invention includes an outboard motor body, an electric motor, an electrical circuit, a semiconductor fuse, an operator, a controller and an output. The outboard motor body includes an engine. The electric motor drives the outboard motor body. The electrical circuit electrically connects the electric motor and an electric power supply to each other. The semiconductor fuse is located in the electrical circuit. The semiconductor fuse switches from an on state that allows power to be supplied from the electric power supply to the electric motor to an off state that shuts off the supply of power from the electric power supply to the electric motor when a predetermined fail condition is satisfied. The semiconductor fuse turns back to the on state from the off state upon receipt of a predetermined recovery command signal. The operator outputs a signal indicating an operation by a user.

The controller is configured or programmed to control the electric motor. The output outputs predetermined notification information in response to a notification command signal output by the controller. When the controller has received a shut-off signal indicating that the semiconductor fuse is in the off state, the controller outputs the notification command signal and causes the output to output the notification information. When the controller has received a recovery operation signal indicating a predetermined operation by the user when the semiconductor fuse is in the off state, the controller outputs the recovery command signal to the semiconductor fuse.

According to a preferred embodiment of the present invention, an output outputs notification information when a semiconductor fuse turns off. Due to this, a user is able to easily discern that the semiconductor fuse has turned off. The user is also able to perform a predetermined operation on an operator when the semiconductor fuse has turned off to turn the semiconductor fuse back on.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
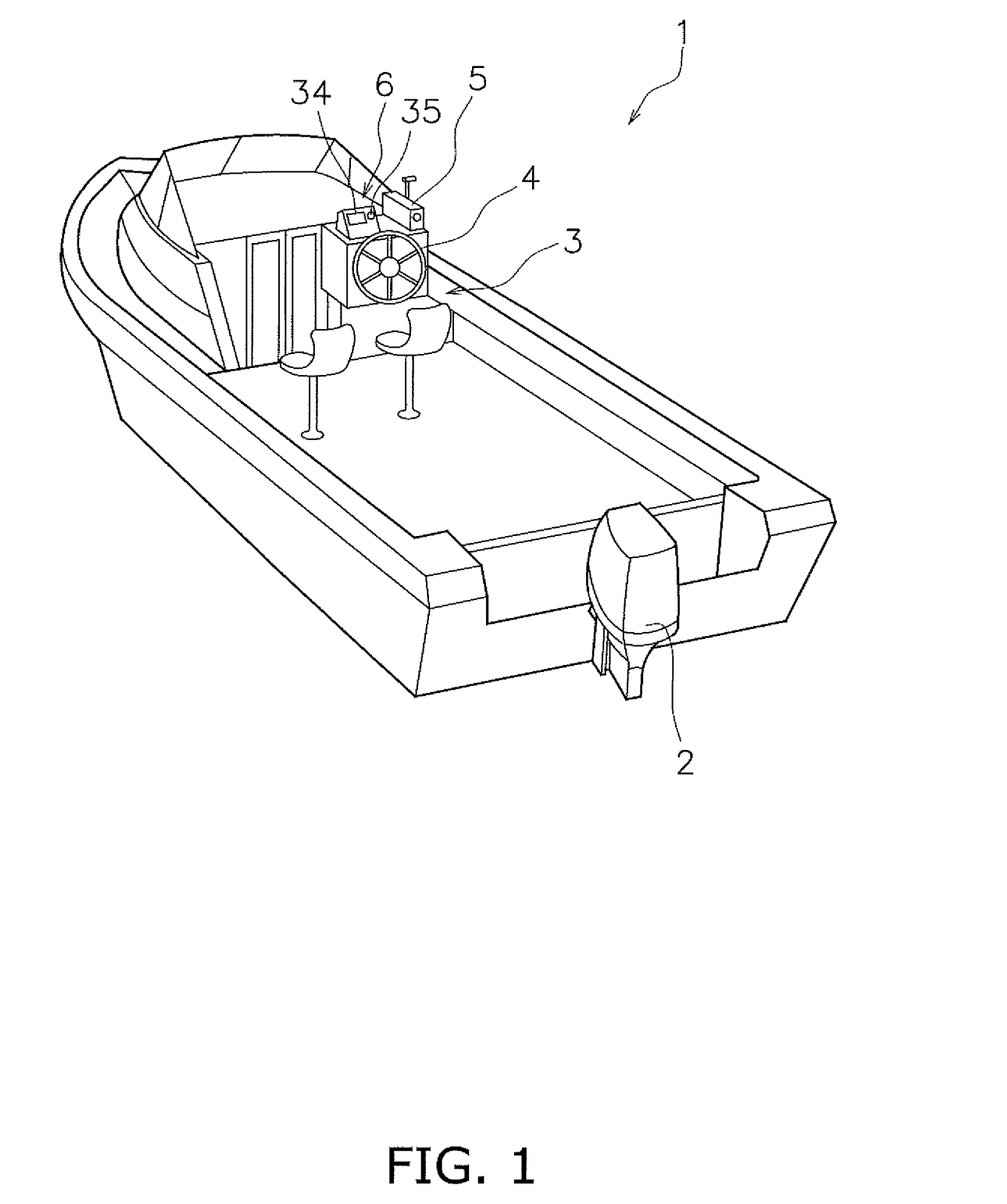
FIG. 1 is a perspective view illustrating a boat provided with an outboard motor according to a preferred embodiment of the present invention.

Preferred embodiments of the present invention are described below with reference to the drawings. FIG. 1 is a perspective view illustrating a boat 1 provided with an outboard motor 2 according to a preferred embodiment of the present invention. The outboard motor 2 is mounted to the stern of the boat 1. The outboard motor 2 generates a propulsion force to propel the boat 1. Only one outboard motor 2 is described in the present preferred embodiment, but the boat 1 may be provided with two or more outboard motors.

The boat 1 includes a helm seat 3. The helm seat 3 is provided with a steering member 4, a first remote control 5 and a second remote control 6. The steering member 4 is used by the user to control the steering direction of the boat 1. The steering member 4 is, for example, a steering wheel. The first remote control 5 is used by the user to control the speed of the boat. The first remote control 5 is used by the user to switch the boat between forward and reverse propulsion. The second remote control 6 is described below.

Figure 2:
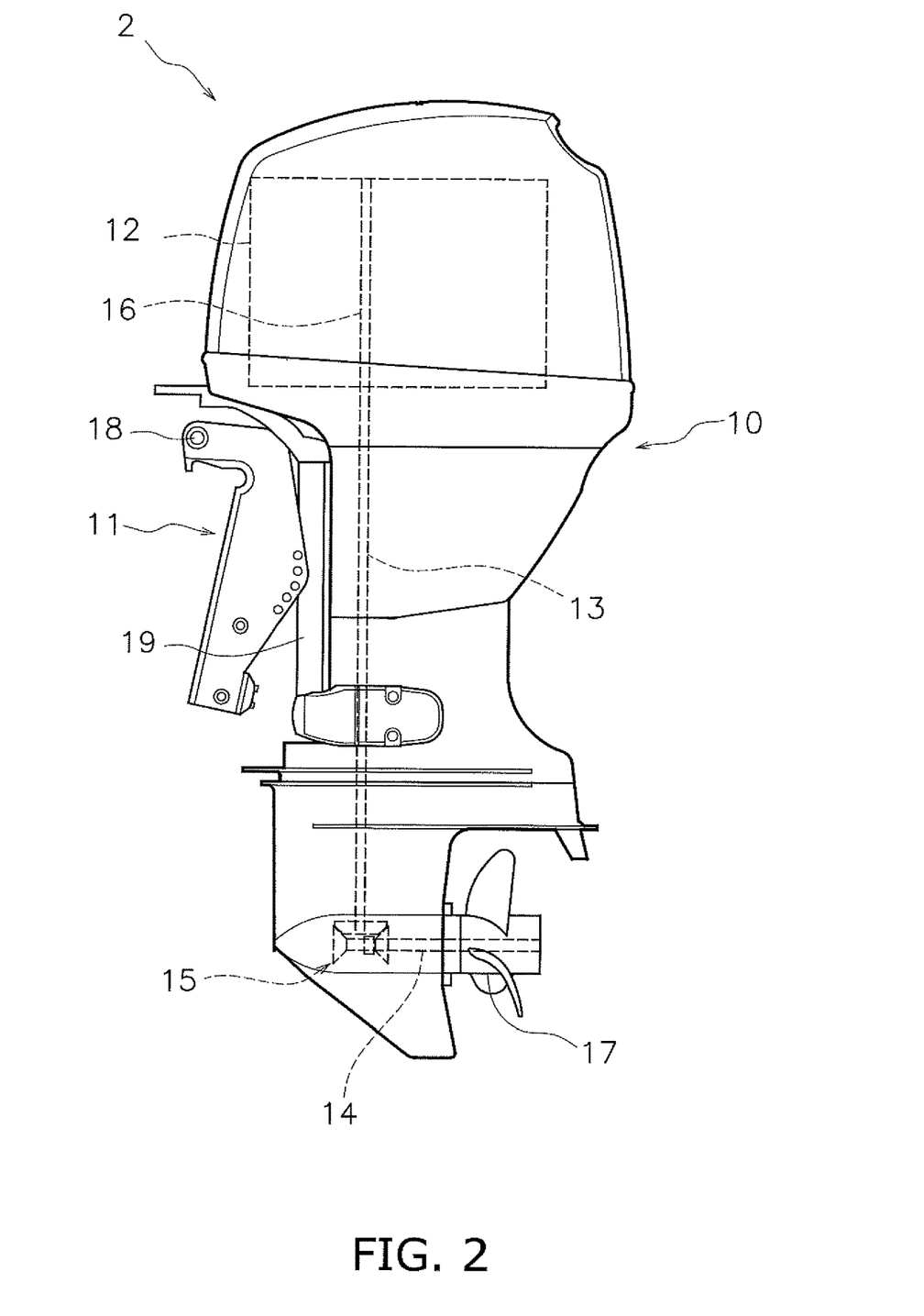
FIG. 2 is a side view illustrating the outboard motor.

FIG. 2 is a side view illustrating the outboard motor 2. The outboard motor 2 includes an outboard motor body 10 and a bracket 11. The outboard motor body 10 is mounted to the boat 1 using the bracket 11. The outboard motor body 10 includes an engine 12, a drive shaft 13, a propeller shaft 14 and a shifting mechanism 15.

The engine 12 generates a propulsion force to propel the boat 1. The engine 12 includes a crank shaft 16 that extends in a vertical direction. The drive shaft 13 is connected to the crank shaft 16. The drive shaft 13 extends in the vertical direction. The propeller shaft 14 extends in a front/rear direction. The propeller shaft 14 is connected to the drive shaft 13 via the shifting mechanism 15. A propeller 17 is connected to the propeller shaft 14.

The shifting mechanism 15 switches the rotational direction of power that is transmitted from the drive shaft 13 to the propeller shaft 14. The shifting mechanism 15 includes, for example, a plurality of gears and a clutch that changes an engagement between the gears.

The bracket 11 includes a trim-and-tilt shaft 18 and a steering shaft 19. The trim-and-tilt shaft 18 extends in a left/right direction. The bracket 11 supports the outboard motor body 10 so that the outboard motor body 10 is able to rotate about the trim-and-tilt shaft 18. The steering shaft 19 extends in the vertical direction. The bracket 11 supports the outboard motor body 10 so that the outboard motor body 10 is able to rotate about the steering shaft 19.

Figure 3:
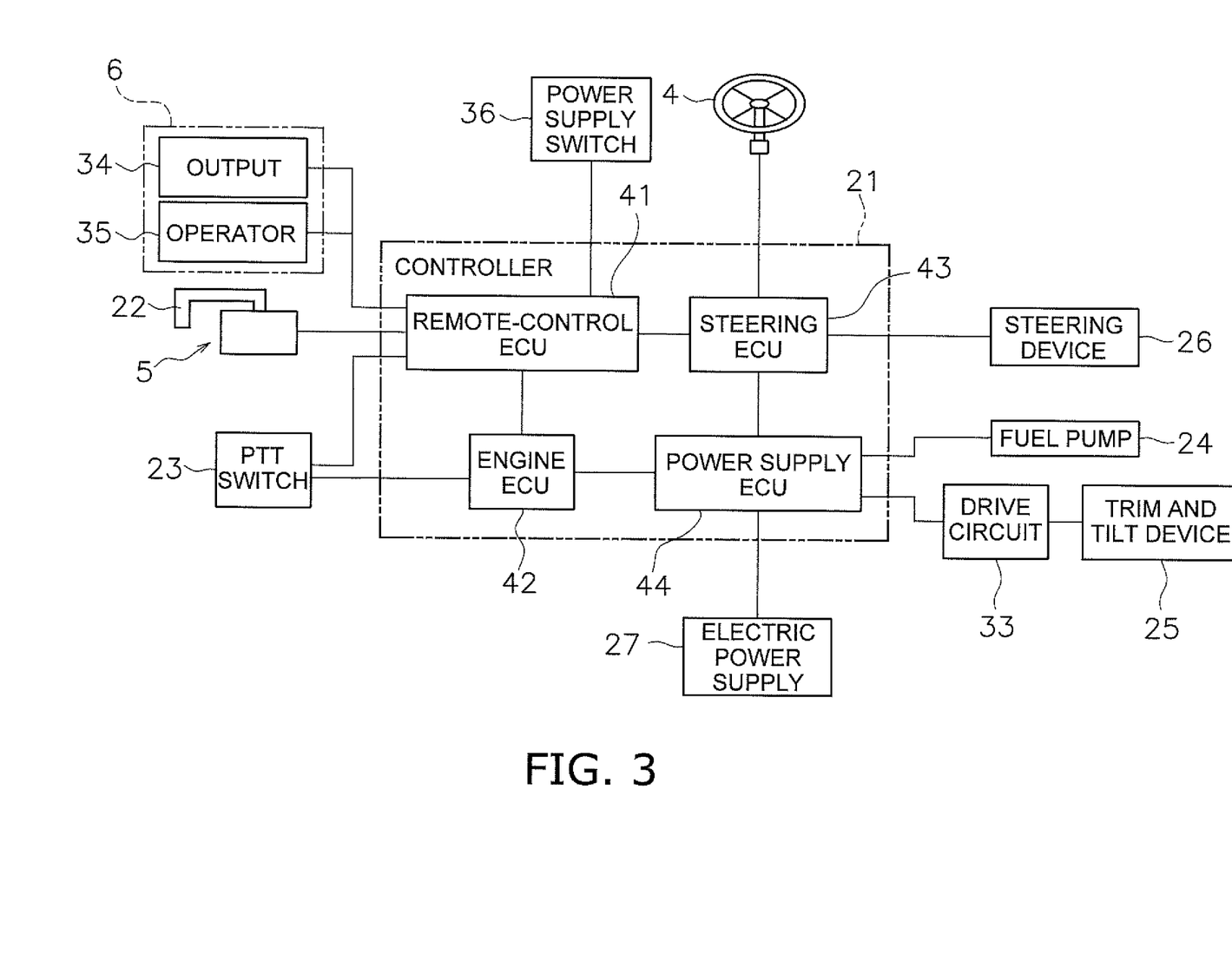
FIG. 3 is a schematic diagram illustrating a control system of the outboard motor.

FIG. 3 is a schematic diagram illustrating a control system of the outboard motor 2. As illustrated in FIG. 3, the outboard motor 2 includes a controller 21. The controller 21 includes a processor such as a CPU and memory such as a RAM and/or a ROM. The controller 21 stores programs and data used to control the outboard motor 2. The controller 21 is communicably connected to the steering member 4, first remote control 5 and second remote control 6.

The controller 21 includes a plurality of electronic control units (ECUs). More specifically, the controller 21 includes a remote control ECU 41, an engine ECU 42, a steering ECU 43 and a power supply ECU 44. The remote control ECU 41, the engine ECU 42, the steering ECU 43 and the power supply ECU 44 each include a computer that includes a processor such as a CPU and a memory such as a RAM and/or a ROM. The remote control ECU 41, the engine ECU 42, the steering ECU 43 and the power supply ECU 44 are connected to each other to allow data to be transferred to/from each device via a communication line or a wireless connection.

The steering member 4 is able to rotate to the left and right from a central position. The steering member 4 outputs an operation signal indicating the position of the steering member 4 to the steering ECU 43.

The first remote control 5 includes a throttle member 22. The throttle member 22 is, for example, a throttle lever. The throttle member 22 is able to be operated in a forward direction and a reverse direction from a neutral operation position. The first remote control 5 outputs an operation signal indicating the position of the throttle member 22 to the remote control ECU 41.

The second remote control 6 includes an output 34 and an operator 35. The output 34 outputs predetermined notification information according to a notification command signal output from the controller 21. The notification information includes information indicating whether a semiconductor fuse 37, which is described below, is in an on state or an off state. The output 34 includes, for example, a display. The notification information includes a notification to be displayed on the display. The notification may be text, a symbol or an image that indicates the state of the semiconductor fuse 37.

The operator 35 outputs a signal indicating an operation by the user. The operator 35 includes a switch. The operator 35 outputs a recovery operation signal when the switch is operated. The recovery operation signal turns the semiconductor fuse 37 back to the on state from the off state. The switch may be a hardware key separate from the display of the output 34. Alternatively, the display of the output 34 may include a touch panel and the switch may include a software key on the display.

The outboard motor 2 includes a fuel pump 24, a trim-and-tilt device 25 and a steering device 26. The fuel pump 24 is connected to a fuel tank disposed in the outboard motor body 10 or on the boat 1. The fuel pump 24 supplies fuel from the fuel tank to the engine 12.

The trim-and-tilt device 25 rotates the outboard motor body 10 about the trim-and-tilt shaft 18 to tilt the outboard motor body 10 in the up/down direction. The steering device 26 rotates the outboard motor body 10 about the steering shaft 19 to steer the outboard motor body 10 in the left/right direction.

The engine ECU 42 receives a signal indicating an operation amount of the throttle member 22 from the remote control ECU 41. The engine ECU 42 outputs a command signal to the engine 12 so as to increase/decrease the speed of the engine according to the operation amount of the throttle member 22. Therefore, the user is able to adjust the speed of the boat 1 by operating the throttle member 22.

The steering ECU 43 receives a signal indicating the operation amount and the operation direction of the steering member 4 from the steering member 4. The steering ECU 43 outputs a command signal to the steering device 26 so as to steer the outboard motor body 10 in the left/right direction according to the operation amount and the operation direction of the steering member 4. Therefore, the user is able to adjust the travel direction of the boat 1 by operating the steering member 4.

The outboard motor 2 includes a PTT switch 23. The PTT switch 23 is used by the user to operate trim-and-tilt of the outboard motor body 10. The PTT switch 23 is disposed in, for example, the outboard motor body 10. Alternatively, the PTT switch 23 may be disposed in another device such as the first remote control 5. When the PTT switch 23 is operated, a signal indicating that the PTT switch 23 is being operated is output to the remote control ECU 41. The signal indicating that the PTT switch 23 is being operated may be output to the engine ECU 42.

Figure 4:
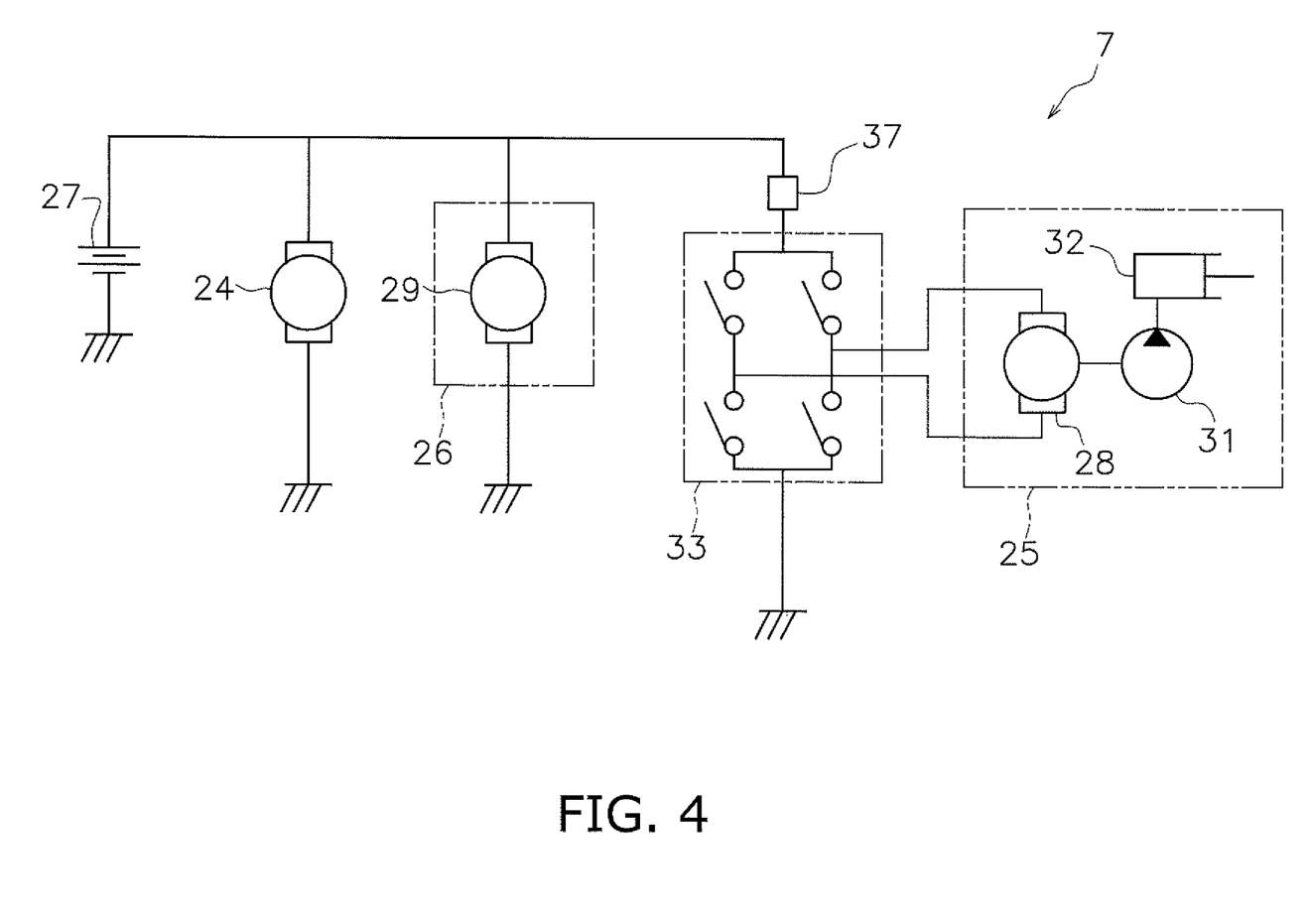
FIG. 4 is a schematic diagram illustrating an electrical circuit in the outboard motor.

FIG. 4 is a schematic diagram illustrating an electrical circuit 7 in the outboard motor 2. As illustrated in FIG. 4, the outboard motor 2 includes an electric power supply 27. The electric power supply 27 includes, for example, a battery. The fuel pump 24 is preferably an electric pump and is electronically connected to the electric power supply 27. The fuel pump 24 is driven by power supplied from the electric power supply 27.

The trim-and-tilt device 25 includes a first electric motor 28. The first electric motor 28 is electronically connected to the electric power supply 27. The first electric motor 28 is driven by power supplied from the electric power supply 27. The trim-and-tilt device 25 includes a hydraulic pump 31 and a hydraulic cylinder 32. The hydraulic pump 31 is driven by the first electric motor 28. The hydraulic cylinder 32 expands and contracts due to working fluid discharged by the hydraulic pump 31. The trim-and-tilt device 25 uses the expansion/contraction of the hydraulic cylinder 32 to tilt the outboard motor body 10 in the up/down direction.

The steering device 26 includes a second electric motor 29. The second electric motor 29 is electronically connected to the electric power supply 27. The second electric motor 29 is driven by power supplied from the electric power supply 27. The steering device 26 is driven by the second electric motor 29 to steer the outboard motor body 10 in the left/right direction.

The power supply ECU 44 receives the signal indicating that the PTT switch 23 is being operated from either the remote control ECU 41 or the engine ECU 42. The power supply ECU 44 outputs a command signal to the trim-and-tilt device 25 so that the outboard motor body 10 is tilted in the up/down direction according to the operation of the PTT switch 23.

As illustrated in FIG. 3, the outboard motor body 10 includes a power supply switch 36. When the power supply switch 36 is turned on, power is supplied from the electric power supply 27 to the fuel pump 24, the first electric motor 28 of the trim-and-tilt device 25 and the second electric motor 29 of the steering device 26. When the power supply switch 36 is turned off, the supply of power from the electric power supply 27 to the fuel pump 24, the first electric motor 28 of the trim-and-tilt device 25 and the second electric motor 29 of the steering device 26 is shut off. Note that the power supply switch 36 may be disposed outside of the outboard motor 2.

As illustrated in FIGS. 3 and 4, the electrical circuit 7 of the outboard motor 2 includes a drive circuit 33. The drive circuit 33 electronically connects the first electric motor 28 of the trim-and-tilt device 25 and the electric power supply 27 to each other. The drive circuit 33 controls current input to the first electric motor 28. The drive circuit 33 includes, for example, a plurality of relays. Each of the plurality of relays is, for example, a mechanical relay. Alternatively, each of the plurality of relays may be a semiconductor relay. The power supply ECU 44 controls the first electric motor 28 by controlling the drive circuit 33.

The electrical circuit 7 of the outboard motor 2 includes the semiconductor fuse 37. The semiconductor fuse 37 is a power semiconductor device referred to as an intelligent power module (IPM) or an intelligent power device (IPD). The semiconductor fuse 37 is disposed between the electric power supply 27 and the drive circuit 33 in the electrical circuit 7.

The semiconductor fuse 37 switches from on to off when a predetermined fail condition is satisfied. When the semiconductor fuse 37 is on, power is able to be supplied from the electric power supply 27 to the first electric motor 28. When the semiconductor fuse 37 is off, the supply of electric power from the electric power supply 27 to the first electric motor 28 is shut off. When the semiconductor fuse 37 receives a predetermined recovery command signal, the semiconductor fuse 37 turns back on after being in the off state.

Note that the semiconductor fuse 37 is switched between on and off according to a signal output from the power supply ECU 44. The power supply ECU 44 switches the semiconductor fuse 37 off when the predetermined fail condition is satisfied. Further, the semiconductor fuse 37 has a self-protection feature and turns itself off when the predetermined fail condition is satisfied, without the need for the signal from the power supply ECU 44. The predetermined fail condition includes an occurrence of overcurrent. The overcurrent occurs when, for example, the current entering the first electric motor 28 has exceeded a predetermined threshold value.

The controller 21 outputs a notification command signal to the output 34 when the predetermined fail condition is satisfied. For example, the power supply ECU 44 determines whether or not the predetermined fail condition is satisfied. When the predetermined fail condition is satisfied, the power supply ECU 44 outputs a fail signal to the engine ECU 42. Upon receipt of the fail signal, the engine ECU 42 outputs the notification command signal to the output 34 via the remote control ECU 41. When the output 34 receives the notification command signal, the output 34 displays a notification on the output 34 indicating that the semiconductor fuse 37 is off. The notification that is displayed on the output 34 tells the user that the semiconductor fuse 37 is off.

When the semiconductor fuse 37 is off, the user is able to turn the semiconductor fuse 37 back on by operating the operator 35. When the user operates the operator 35, the operator 35 outputs a recovery operation signal. While the semiconductor fuse 37 is off, the power supply ECU 44 outputs a recovery command signal to the semiconductor fuse 37 upon receipt of the recovery operation signal from the operator 35. The recovery command signal turns the semiconductor fuse 37 back on after being in the off state. When the semiconductor fuse 37 receives the recovery command signal from the power supply ECU 44, the semiconductor fuse 37 turns back on.

Note that the power supply ECU 44 outputs the recovery command signal to the semiconductor fuse 37 when the power supply switch 36 is turned off in a state in which the semiconductor fuse 37 is in the off state.

With the outboard motor 2 according to the preferred embodiment described above, the semiconductor fuse 37 automatically turns off due to the self-protection feature when the predetermined fail condition is satisfied. Otherwise, the semiconductor fuse 37 turns off in response to a command output by the controller 21. With this configuration, the first electric motor 28 is protected. In addition, the output 34 outputs the notification information when the semiconductor fuse 37 has turned off. Due to this, the user is able to easily discern that the semiconductor fuse 37 has turned off. Further, when the semiconductor fuse 37 has turned off, the user is able to turn the semiconductor fuse 37 back on by operating the switch of the operator 35. As a result, the user is able to easily discern whether the semiconductor fuse 37 is on or off.

Preferred embodiments of the present invention have been described above, but the present invention is not limited to the above-described preferred embodiments and can be altered in various ways without departing from the gist of the present invention.

In the preferred embodiments described above, the electric power supply 27 is preferably disposed inside the outboard motor 1. However, the electric power supply 27 may be disposed outside the outboard motor 2.

The output 34 is not limited to a display and may be another device such as a warning light or a speaker. The notification information is not limited to information on the display and may be a warning light turning on or blinking, or a speaker sounding.

The operator may be the main switch (power supply switch) of the outboard motor 2. When the main switch is turned off by the user, the controller 21 may output a recovery command signal to the semiconductor fuse 37 to turn the semiconductor fuse 37 back on.

Figure 5:
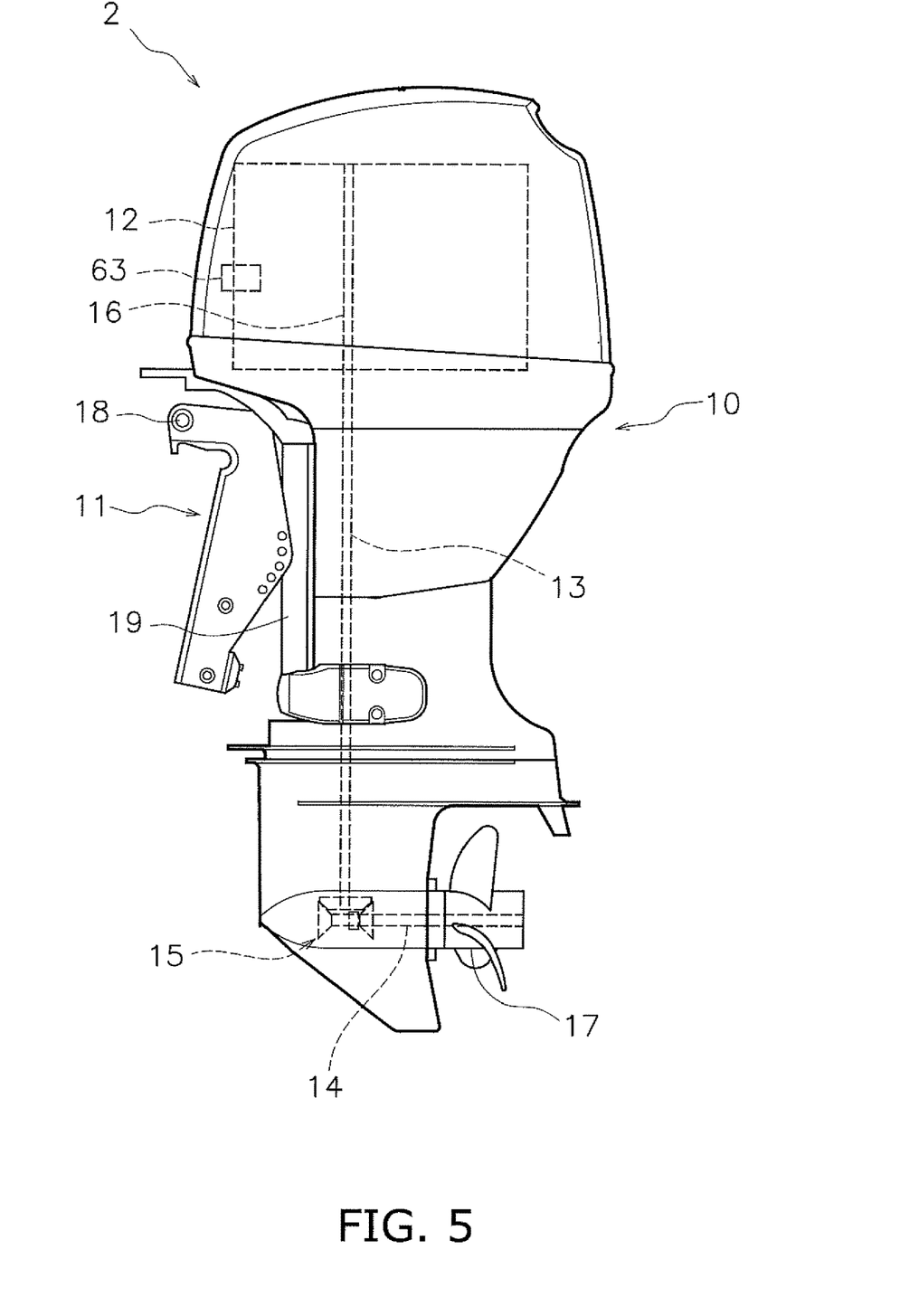
FIG. 5 is a side view illustrating an outboard motor according to a modified preferred embodiment of the present invention.

The location of the output 34 and the operator 35 are not limited to the driver seat of the boat 1, and the output 34 and the operator 35 may be disposed at a different location on the boat 1. The output 34 and the operator 35 may be disposed at different locations from each other. The output 34 and the operator 35 may be disposed in the outboard motor 2. For example, FIG. 5 is a side view illustrating the outboard motor 2 according to a modified preferred embodiment of the present invention. As illustrated in FIG. 5, the outboard motor 2 includes a fuse box 63. The fuse box 63 is disposed inside the outboard motor body 10. The fuse box 63 stores the semiconductor fuse 37.

Figure 6:
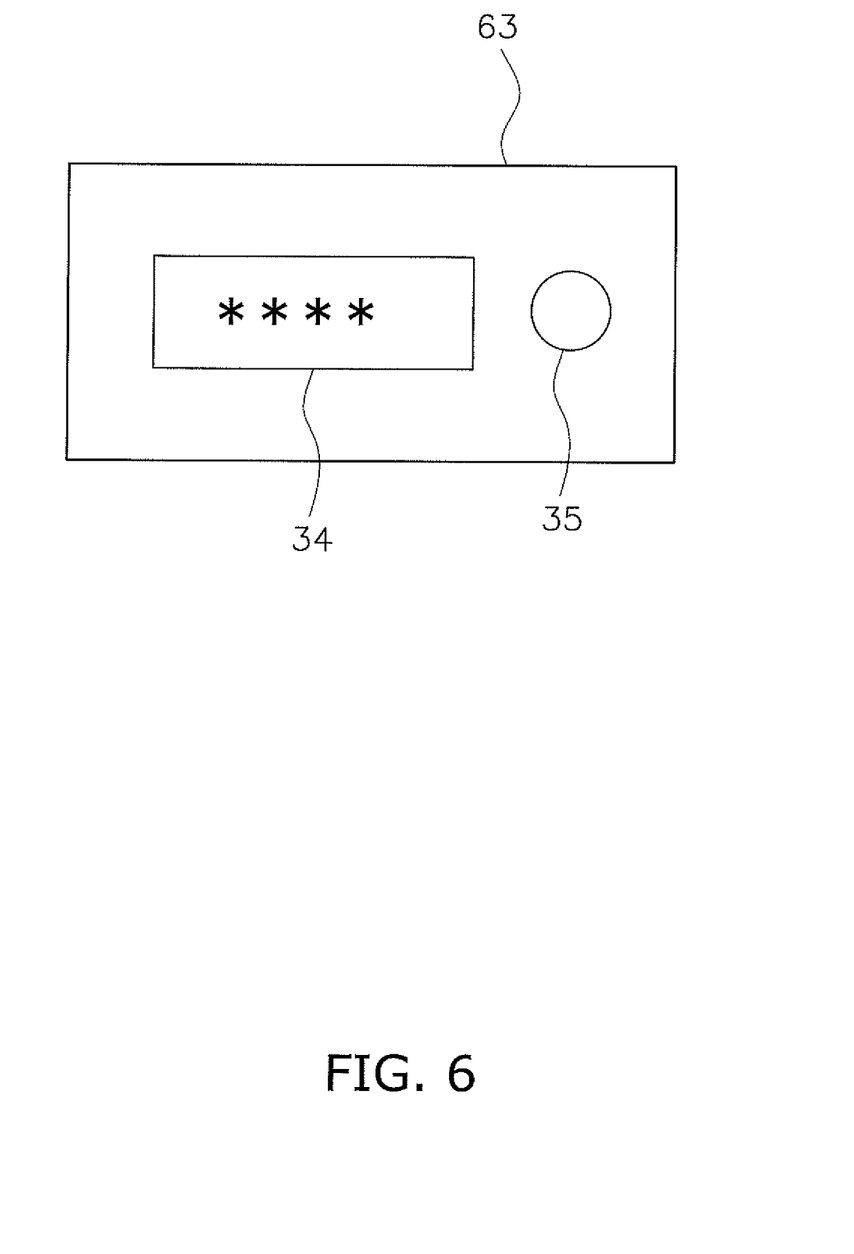
FIG. 6 is a schematic diagram illustrating a fuse box according to a modified preferred embodiment of the present invention.

FIG. 6 is a schematic diagram illustrating the fuse box 63. As illustrated in FIG. 6, the output 34 and the operator 35 may be disposed in the fuse box 63. The output 34 may be a display provided on the fuse box 63. The operator 35 may be a switch provided on the fuse box 63.

In the preferred embodiments described above, the semiconductor fuse 37 is provided in order to protect the first electric motor 28 of the trim-and-tilt device 25. However, the semiconductor fuse 37 may be provided in order to protect another electric motor. For example, the semiconductor fuse 37 may be provided in order to protect the second electric motor 29 of the steering device 26. The semiconductor fuse 37 is not limited to protect a motor and may be provided in order to protect another component in the electrical system of the outboard motor 2 such as electrical wiring.

The location of the semiconductor fuse 37 in the electrical circuit 7 may be changed. For example, while the semiconductor fuse 37 is disposed upstream of the drive circuit 33 in the preferred embodiments described above, the semiconductor fuse 37 may be disposed downstream of the drive circuit 33. Alternatively, semiconductor fuses 37 may be disposed both upstream and downstream of the drive circuit 33 respectively.

The fail condition may be that overcurrent has been detected for a predetermined number of times or more. The fail condition may be a condition other than the occurrence of overcurrent. For example, the fail condition may include some or all of the conditions such as an irregularity in the semiconductor fuse 37, occurrence of overvoltage, occurrence of overheating, ON failure, OFF failure or a simultaneous ON operation of the PTT switch 23.

Note that the ON failure refers to a state in which current is running through the first electric motor 28 even though the controller 21 has not received a signal indicating that the PTT switch 23 is being operated. The OFF failure refers to a state in which current is not running through the first electric motor 28 even though the controller 21 has received a signal indicating that the PTT switch 23 is being operated. The simultaneous ON operation refers to a state in which a command signal to raise the outboard motor body 10 and a command signal to lower the outboard motor body 10 are output at the same time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an outboard motor body including an engine;
   an electric motor that moves the outboard motor body;
   an electrical circuit that electronically connects the electric motor to an electric power supply;
   a semiconductor fuse located in the electrical circuit and that switches from an on state that allows electric power to be supplied from the electric power supply to the electric motor to an off state that shuts off the electric power supplied from the electric power supply to the electric motor when a predetermined fail condition is satisfied, and that turns back to the on state from the off state upon receipt of a predetermined recovery command signal;
   an operator that outputs a signal indicating an operation by a user;
   a controller configured or programmed to control the electric motor; and
   an output that outputs predetermined notification information in response to a notification command signal output from the controller; wherein
   the controller is configured or programmed to:
      output the notification command information and cause the output to output the notification information when the controller receives a shut-off signal indicating that the semiconductor fuse is in the off state; and
      output the recovery command signal to the semiconductor fuse when the controller receives a recovery operation signal indicating a predetermined operation by the user in a state in which the semiconductor fuse is in the off state;
   the operator includes a switch; and
   the operator outputs the recovery operation signal when the switch is operated.

2. The outboard motor according to claim 1, further comprising:
   a remote control disposed outside of the outboard motor body; wherein
   the operator is disposed in the remote control.

3. The outboard motor according to claim 1, further comprising:
   a remote control disposed outside of the outboard motor body; wherein
   the output is disposed in the remote control.

4. The outboard motor according to claim 1, further comprising:
   a fuse box disposed inside the outboard motor body; wherein
   the operator is disposed in the fuse box.

5. The outboard motor according to claim 1, further comprising:
   a fuse box disposed inside the outboard motor body; wherein
   the output is disposed in the fuse box.

6. The outboard motor according to claim 1, wherein the output includes a display; and the notification information includes a notification displayed on the display.

7. The outboard motor according to claim 1, wherein the fail condition is that an overcurrent has been detected a predetermined number of times or more.

8. An outboard motor comprising:
an outboard motor body including an engine;
an electric motor that moves the outboard motor body;
an electrical circuit that electronically connects the electric motor to an electric power supply;
a semiconductor fuse located in the electrical circuit and that switches from an on state that allows electric power to be supplied from the electric power supply to the electric motor to an off state that shuts off the electric power supplied from the electric power supply to the electric motor when a predetermined fail condition is satisfied, and that turns back to the on state from the off state upon receipt of a predetermined recovery command signal;
an operator that outputs a signal indicating an operation by a user;
a controller configured or programmed to control the electric motor; and
an output that outputs predetermined notification information in response to a notification command signal output from the controller; wherein
the controller is configured or programmed to:
output the notification command information and cause the output to output the notification information when the controller receives a shut-off signal indicating that the semiconductor fuse is in the off state; and
output the recovery command signal to the semiconductor fuse when the controller receives a recovery operation signal indicating a predetermined operation by the user in a state in which the semiconductor fuse is in the off state;
the operator includes a power supply switch of the outboard motor; and
the controller is configured or programmed to output the recovery command signal to the semiconductor fuse when the power supply switch is turned off.

9. The outboard motor according to claim 1, further comprising:
a trim-and-tilt device that tilts the outboard motor body in an up/down direction; wherein
the electric motor is included in the trim-and-tilt device.

10. The outboard motor according to claim 1, further comprising:
a steering device that steers the outboard motor body in a left/right direction; wherein
the electric motor is included in the steering device.

* * * * *